United States Patent [19]

Lentino et al.

[11] Patent Number: 4,963,779
[45] Date of Patent: Oct. 16, 1990

[54] BRUSH HOLDER FOR AN ELECTRIC MOTOR

[75] Inventors: Lynn E. Lentino, Westminster; Terry L. Turner, Finksburg, both of Md.

[73] Assignee: Black & Decker, Inc., Newark, Del.

[21] Appl. No.: 351,996

[22] Filed: May 15, 1989

[51] Int. Cl.$^5$ ............................................ H02K 11/00
[52] U.S. Cl. ........................................ 310/71; 310/45; 310/180; 310/239; 310/242
[58] Field of Search ............... 310/71, 50, 42, 43, 310/45, 239, 240, 241, 242, 245, 247, 248, 249, 91, 254, 179, 180, 68 A, 184, 77, 40 MM; 439/223

[56] References Cited

U.S. PATENT DOCUMENTS

| | | | |
|---|---|---|---|
| 4,056,749 | 11/1977 | Carlson | 310/239 |
| 4,322,647 | 3/1982 | Neroda et al. | 310/71 |
| 4,348,603 | 9/1982 | Huber | 310/50 |
| 4,370,579 | 1/1983 | Kobayashi et al. | 310/50 |
| 4,498,230 | 12/1985 | Harris | 310/242 |
| 4,513,214 | 4/1985 | Dieringer | 310/71 |
| 4,538,085 | 8/1985 | Tanaka | 310/239 |
| 4,574,471 | 3/1986 | Dibbern | 310/71 |
| 4,613,781 | 9/1986 | Sanders | 310/239 |

FOREIGN PATENT DOCUMENTS

| | | |
|---|---|---|
| 7933642 | 4/1980 | Fed. Rep. of Germany. |
| 3123517 | 2/1983 | Fed. Rep. of Germany. |
| 0082097 | 6/1980 | Japan. |
| 0028297 | 2/1984 | Japan. |
| 431962 | 7/1935 | United Kingdom. |
| 2094069 | 9/1982 | United Kingdom. |
| 2160369 | 12/1985 | United Kingdom ............... 310/71 |
| 2113924 | 11/1986 | United Kingdom. |
| 2182500 | 5/1987 | United Kingdom. |

Primary Examiner—R. Skudy
Attorney, Agent, or Firm—Dennis A. Dearing; Charles E. Yocum; John D. Del Ponti

[57] ABSTRACT

In a unitary bifurcated brush holder for a small electric motor, a pair of coplanar terminal tabs, each axially spaced and laterally offset from the brush holder sleeve, extend axially of the motor for direct plug-in engagement, in assembly operation, with terminals at the commutator end of a stator assembly. The brush holder is made from a single sheet metal stamping. The terminal tabs are carried at the end of a support arm extending from a wall of the brush holder sleeve. In assembly, the brush holder is mounted in an insulator which includes support bosses for engaging and augmenting the support of the rear end of the terminal tabs.

26 Claims, 3 Drawing Sheets

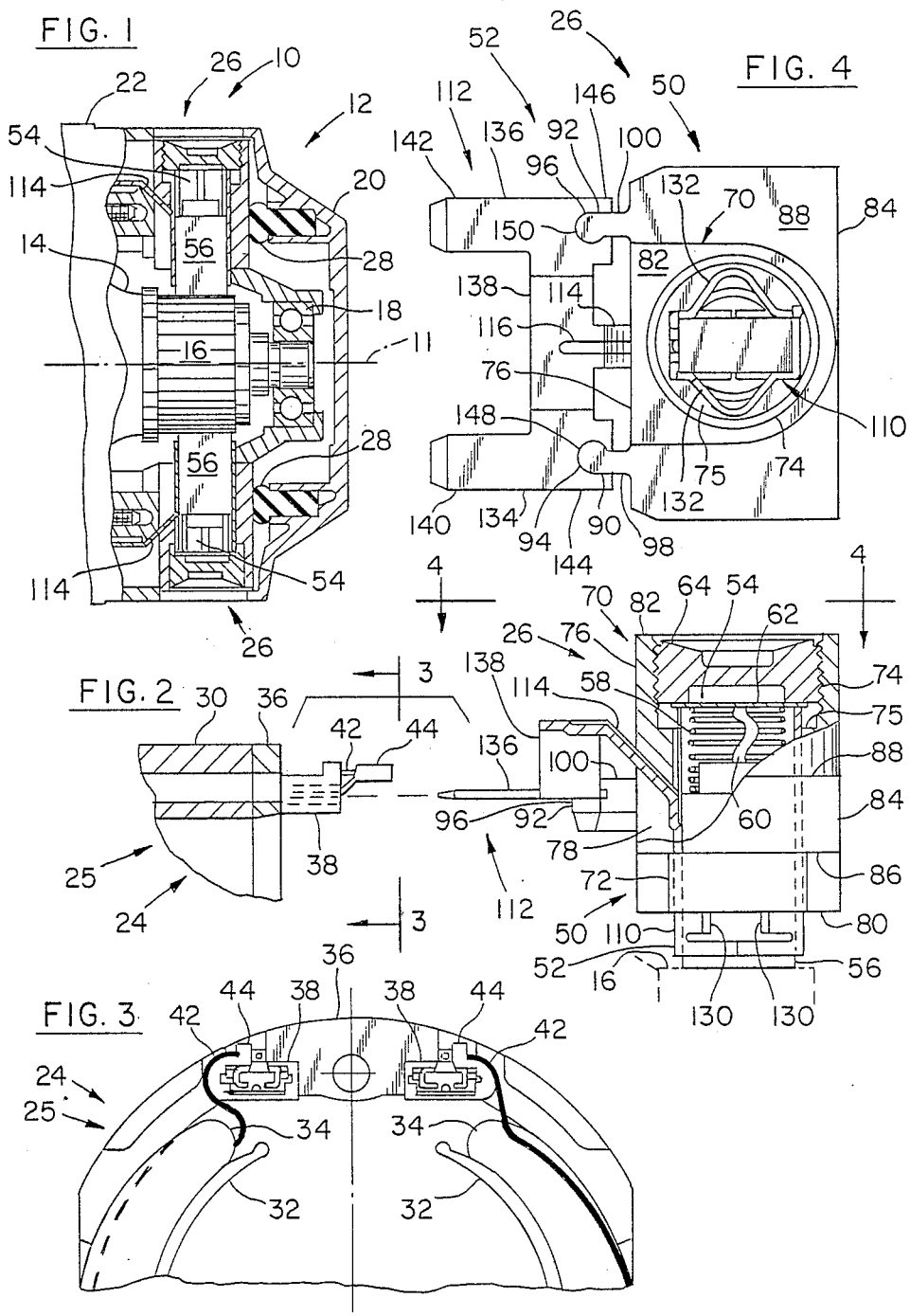

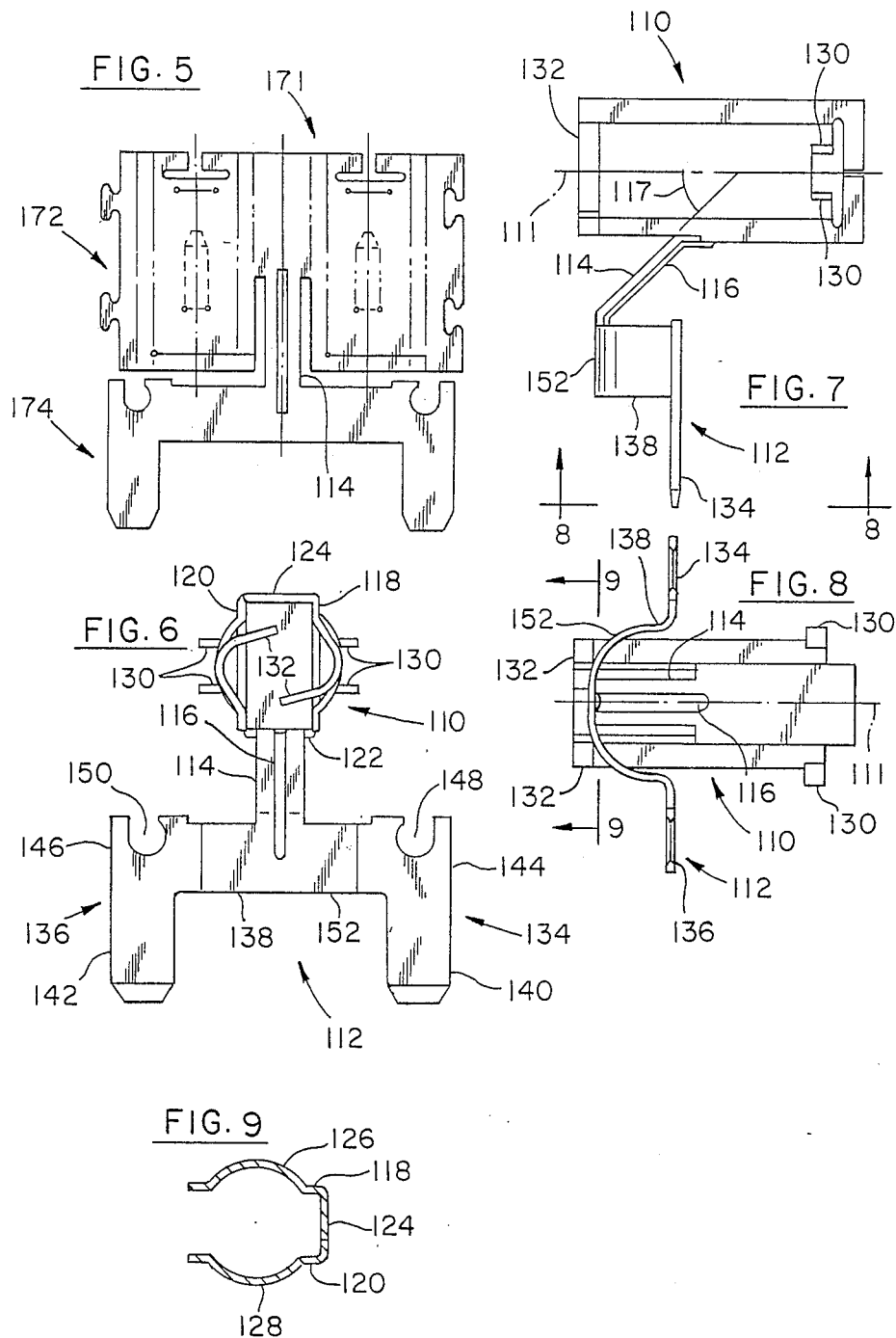

BRUSH HOLDER FOR AN ELECTRIC MOTOR

BACKGROUND OF THE INVENTION

The invention concerns brush holders and brush holder subassemblies and their electrical connection, particularly for small motors of the type typically used in portable tools and domestic appliances.

Given the high production volumes and strong competition in the portable tool and appliance markets, economical design is essential for profitability. Design efforts to simplify and eliminate parts and to facilitate automation of assembly are patentially very rewarding. Brush holder design and arrangement, the subject matter of the present invention, has been included in these cost saving design activities. For example, U.S. Pat. Nos. 4,613,781 Sanders, and 4,498,230 Harris, sharing a common assignee with the present invention, both disclose brush holders of simple rectangular shape formed from a stamped flat pattern of sheet material and including an integral terminal for direct plug-in connection of the brush holder to other motor elements. U.S. Pat. No. 4,056,749 Carlson discloses a brush holder of similar construction supported by a motor end bracket and oriented so that in assembly a single brush terminal, extending axially, may be inserted directly into a fixed terminal of a terminal board on an end of the stator assembly of the motor. Electrical connection from a field winding to the brush is thus completed without the need for a jumper or additional terminals, simplifying assembly and facilitating its automation.

In the known simple formed sheet metal brush holder designs it is typical for the single terminal to be "close coupled" to the sleeve of the brush holder and, for strength and stability reasons, to be of limited length. The simple form of these brush holder designs largely predetermines and limits the disposition of the terminal relative to the brush holder sleeve and also its reach from the sleeve. This, in turn, limits the adaptability of the design concept in for example, motor configurations where direct plug-in connection of brush to field, by way of the brush holder, is desired and the axial spacing between field and brush is relatively great. And these simple brush holder designs are not, for example, obviously adaptable to more complex motors which may require two connections to each brush, for example in a dynamically braked motor using a dedicated secondary winding for the braking mode.

SUMMARY OF THE INVENTION

Accordingly it is an object of the invention to provide an economically manufactured electrically conductive unitary brush holder for an electric motor comprising a sleeve portion for slidably receiving a brush and an integral terminal portion extending in a plane perpendicular to the sleeve, and carried by a support member so as to be spaced from the sleeve and in which the terminal portion may be offset laterally from the axis of the sleeve.

A feature of brush holders according to the invention is that by carrying the terminal portion spaced from the brush holder sleeve the dimensions of that spacing and the final configuration of the brush holder may be varied, within limits, to adapt to a particular motor application.

In one form of the invention a brush holder as just described may be supported by an insulator or carrier for insertion as a brush subassembly into an electric motor housing. A portions of the body of the insulator may be interposed between the brush holder sleeve and terminal portion so as to engage the terminal portion and provide position control and structural support for the terminal portion.

In a preferred embodiment, a brush holder comprises a sleeve portion for slidably receiving a brush, an elongated support arm extending from the sleeve and at least one terminal portion carried by the support arm, spaced from the sleeve and preferably offset from the axis of the sleeve, with the terminal portion having a free connecting end and an opposite support end, the support end being adaptable to be physically supported by another motor element. The other motor element may be an insulator having a body with a through bore for snugly and securely holding the sleeve of the brush holder, and dimensioned so that the support arm emerges from the body and supports the at least one terminal portion, extending away from the body. Preferably a part of the body of the insulator is interposed between the terminal portion and the sleeve and carries a support element for positively engaging the support end of the terminal portion and stabilizing its position relative to the sleeve portion.

The terminal portion of the brush holder may comprise a terminal pair consisting of two parallel, spaced apart terminals connected by a bridging strip, the support arm of the brush holder being connected to the bridging strip, preferably intermediate its ends.

According to the invention, a brush holder may be formed in sheet metal from a flat pattern which is substantially rectangular, comprising two side-by-side rectangular portions, one for substantially forming the sleeve portion of the holder and the support arm, and the other for forming the terminal portion, with very little waste material.

An advantage of a brush holder according to the invention is its compatibility with an electric motor having a wiring schematic requiring two connections to each brush. Then, for example, a pair of terminals on a terminal board or end ring at an end of a stator assembly may be connected directly and without jumpers to the brush by way of a plug-in terminal portion of the brush holder. Preferably the brush holder terminals are oriented axially with respect to the motor axis facilitating, in automated assembly, plug-in connection of both terminals to the field (or other motor elements) with a simple single assembly move.

BRIEF DESCRIPTION OF THE DRAWINGS

FIG. 1 is a partial, cut away, partially sectioned view of the commutator end of the drive motor portion of a power tool embodying the invention.

FIG. 2 is a composite view including a semi-schematic representation of a portion of the commutator end of the stator assembly of the tool of FIG. 1 shown in conjunction with the corresponding brush holder subassembly, aligned for electrical connection with the stator and including a brush holder, with a brush assembly, and an insulator carrying the brush holder.

FIG. 3 is a partial end view of the commutator end of the stator assembly taken approximately on line 3—3 of FIG. 2.

FIG. 4 is a radially outside view of the brush holder subassembly with the brush assembly and retaining cap removed taken approximately on line 4—4 of FIG. 2.

FIG. 5 shows the sheet metal stamping (flat pattern) used to form the brush holder included in FIGS. 2, 4 and 6—9.

FIG. 6 is a radially outside view of the brush alone holder corresponding to the view of FIG. 4.

FIG. 7 is a side view of the brush holder alone corresponding to the view of FIG. 2.

FIG. 8 is a front view of the brush holder taken approximately on line 8—8 of FIG. 7.

FIG. 9 is a cross sectional view of the sleeve portion of the brush holder, taken on line 9—9 of FIG. 8.

DESCRIPTION OF THE PREFERRED EMBODIMENT

Figure 10:
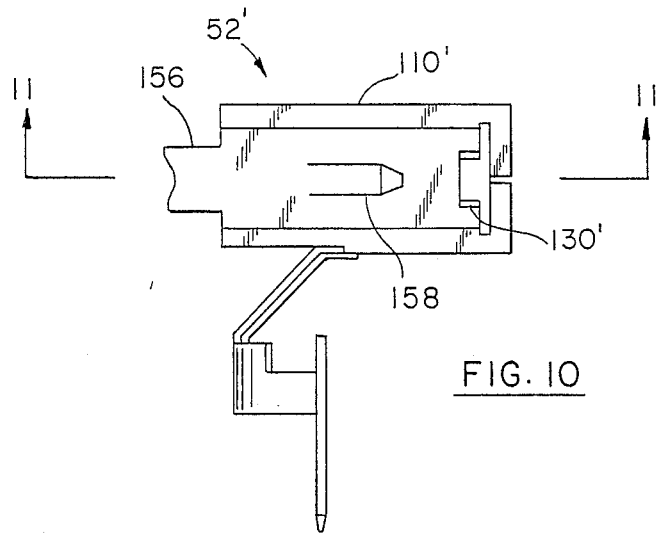
FIG. 10 is a side view similar to FIG. 7 of an alternative embodiment of the brush holder portion of the invention.

The invention is embodied in a power tool such as a circular saw, a part of the drive motor portion 10 of which is shown in FIG. 1.

The motor may be of the series wound universal type. The principal components and general arrangement of such motors are well known and need be only briefly described.

The drive motor portion 10 may be considered elongated with respect to its axis of rotation 11 so that it has opposite, longitudinally spaced ends. In typical series motor construction the motor armature carries a commutator at one end and a ventilating fan at the other end, for convenience, the opposite ends of the motor may be described as fan and commutator ends. The phrase "commutator end" is used freely in the present specification to refer to ends of elongated components or to the location of "complete" components which are disposed adjacent the commutator end of the motor.

FIG. 1 shows the commutator end 12 of the motor portion 10 including a portion of the armature 14 with its commutator 16 journaled in bearing 18. An end cap 20 registers with motor housing 22 which houses the stator assembly 24 the commutator end 25 of which is shown only partly and only in FIGS. 2 and 3. Contained between the end cap 20 and the stator assembly 24 are a pair of diametrically opposite brush holder subassemblies 26, partially held in place by resilient bolsters 28 carried by the end cap 20. The brush holder subassemblies 26 are an important part of the invention and will be described in more detail below.

The stator assembly 24 (FIGS. 2 and 3) is of known design including a laminated core 30 with pole pieces 32 carrying field coils 34. The commutator end 25 of the stator assembly, shown in FIGS. 2 and 3, includes a plastic end ring or terminal board 36 which carries two diametrically opposite pairs of terminal posts 38 (only one pair is shown in the drawings). Each terminal post 38 has an axially extending bore (not shown in detail in the drawings). Each pair of terminal posts 38 is coplanar in a plane parallel to the axis of the motor armature and each post lies at an equal radial distance from the armature axis. The individual windings of the field coils 34 are terminated by crimping winding end leads 42 into terminals 44, which are inserted into the terminal post 38 (as seen best in FIG. 2).

Turning now to the brush holder subassembly 26 and referring particularly to FIGS. 2 and 4—the two brush holder subassemblies 26 used in the embodiment of FIG. 1 are identical and only one is shown in detail in the drawings and need be described.

Insulator 50, made of a suitable plastic material for example, is in effect a vehicle for the electrically conductive brush holder 52. The generally conventional brush assembly 54 includes a rectangular cross section brush 56 which is free to slide radially in the brush holder 52 and is biased against the commutator 16 by a helical spring 58. Good electrical connection between the brush 56 and the brush holder 52 is ensured by a shunt 60 connecting the brush 56 to a connection disc 62 which is clamped securely against an end of the brush holder 52 by a screw threaded retaining cap 64 (shown only in FIG. 2).

The insulator 50 has a semi-cylindrical body 70 with a through bore 72. The radially outward end of the bore 72 is enlarged to form a threaded well 74 (with a flat bottom or floor 75) for receiving the retaining cap 64. The lower portion of the flat front face 76 of the body 70 contains a radially extending (with reference to the armature 16) central slot 78, indicated only in FIG. 2. The respective radially inner and outer end faces 80, 82 of the body 70 are substantially planar. A substantially rectangular guide flange 84 inset somewhat from the inner end face 80 has parallel inner and outer faces 86, 88 respectively, each perpendicular to the radially extending axis of the brush holder assembly. A symmetrically arranged pair of support elements 90, 92 extend forward from the flange 84. As seen best in FIG. 4 each support element is contoured to define a support boss 94, 96 spaced from the flange 84 by stem portions 98, 100.

Details of the brush holder 52 are seen best in FIGS. 5-9. The main elements of the brush holder are a sleeve or body portion 110 having a longitudinal axis 111, a terminal portion (terminal pair) 112 connected to the sleeve 110 by an angled support arm 114, the latter being stiffened by a central rib 116. As seen best in FIGS. 4 and 7, the support arm 114 diverges from the axis 111 of the sleeve portion 110 at an angle 117 of less than 90. In assembly, the support arm 114 emerges from the slot 78 of the insulator body 70. See FIG. 2.

The cross section of the body 110 is essentially rectangular to match the coventional brush 56 and is formed of opposite side walls 118, 120, a front wall 122 and a rear wall 124. However, to accommodate the cylindrical form of the helical compression spring 58 in the radially outward portion of the sleeve, the sleeve form is modified to be partially cylindrical—see arcuate wall portions 126, 128 seen best in FIG. 9. The sleeve portion 110 is located axially in the bore 72 of the insulator body 70 by retaining lugs. At the radially inner end conventional lugs 130 are bent outwards to engage the body inner face 80. At the radially outer end of the sleeve 110, a pair of arcuate tangs 132, normally retracted before assembly, as indicated in FIG. 6, are bent outwards to engage the floor 75 of the insulator threaded well 74. (See FIG. 4.) As well as helping to anchor the brush holder 52 in the insulator 50, the tangs 132 provide a good electrically conductive support surface for the connection disc 62.

In the terminal portion 112 of the brush holder 52 a pair of terminal tabs 134, 136 lie spaced apart in a plane perpendicular to the axis of the sleeve portion 110. The tabs 134, 136 are connected by a bridge strip 138 to the center of which the support arm 114 is connected. Each terminal tab 134, 136 has a connect end 140, 142 (which in assembly is free to mate with the terminal of another motor element) and a support end 144, 146. Each support end is notched 148, 150 in a contoured form matching that of the insulator support elements 90, 92. The bridge strip 138 may be flat, or may be formed to suit a particular application or to establish a particular lateral spacing between the terminal tabs 134, 136 other than that established by the flat pattern. In this embodiment, as seen best in FIG. 8, the bridge strip 138 has a central hump 152, partly to clear mating parts (not shown) in the motor assembly and partly to control the lateral spacing of the terminal tabs 134, 136.

Figure 11:
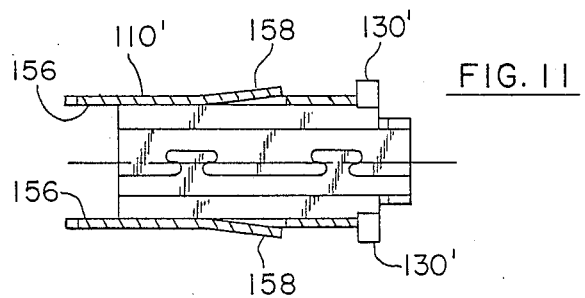
FIG. 11 is a cross sectional view of the sleeve portion of the second embodiment taken on line 11—11 of FIG. 10.

FIGS. 10 and 11 illustrate an alternative embodiment of brush holder 52'. This is formed from a flat pattern generally similar to that of FIG. 5, but not shown in the drawings. This brush holder is of the cartridge type and in assembly tabs 156 are bent inwards and downwards to retain the brush in the sleeve. Again, in locating the sleeve portion 110' in the bore of the insulator, conventional retaining lugs 130' are used at the radially inner end of the assembly. To complete the retention of the sleeve in the body of the insulator, side tabs 158 engage internal notches in the bore of the insulator. (Not shown in the drawings.)

Figure 12:
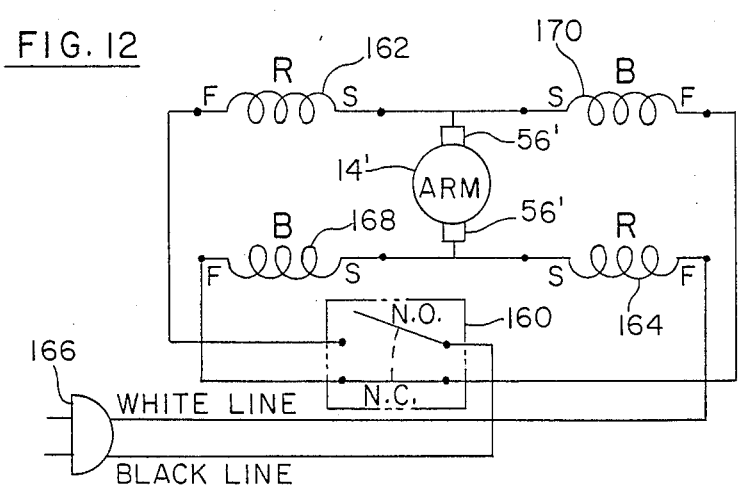
FIG. 12 is a wiring schematic for a dynamically braked series wound universal motor which may be used in the motor portion of the tool of FIG. 1.

Brush holders according to the invention are particularly suited for use in motors having a wiring schematic including two electrical connections to each brush, as in the exemplary schematic of FIG. 12. In this arrangement a secondary winding is dedicated to a dynamic braking function and both primary and secondary windings are electrically split. The motor is controlled by a suitable switching arrangement such as the switch 160 shown in the off or braking position in FIG. 12. In operation, actuation of the switch 160 connects the run windings 162, 164, in series with, but on opposite sides of, the armature 14' to an electrical power source 166. In the braking mode the power is disconnected and the brake windings 168, 170 are connected in shunt across the armature 14' but with the armature electrically between them. As indicated in FIG. 12 each brush 56' is connected simultaneously and permanently to one each of the run and brake windings. A motor with this wiring schematic is the subject of a co-pending U.S. patent application Ser. No. 07/351,995, filed 5/15/89 and sharing a common assignee with the present invention.

In assembly operations the brush holder subassembly 26 (FIGS. 2 and 4) is a sturdy compact unit of good integrity, well adapted to mechanical handling in automated assembly. In a single, simple assembly move the brush holder subassembly 26 may be inserted axially into the motor housing 22 so that the insulator guide flange 84 engages suitable support slots (not shown in the drawings), thus guiding terminal tabs 134, 136 into plug-in electrical connection with the terminals 38 of the stator assembly 24. Thus substantially direct electrical connection may be made between brushes 56 and field coils 34 without the use of jumper wires and without manual intervention.

In the brush holder (52) concept, removing the terminal tabs 134, 136 from direct connection to the walls of the brush holder sleeve 110 by placing them at the end of a support member (arm 114) provides flexibility in application of the design. Both the axial spacing and the lateral offset between the terminal tabs and the brush (held in the sleeve portion of the brush holder) may be set to suit the application. In addition this separation makes it possible if desired, to interpose specific support structure for the terminal tab directly engaging the tab, thus reinforcing the support provided by the material of the brush holder alone. In this exemplary embodiment, as seen best in FIGS. 2 and 4, notches 148, 150 of the terminal tabs closely fit the support bosses 94, 96 of the insulator 50. The bosses may be tapered somewhat so that as the brush holder 52 is slid into the insulator a press fit is obtained between the notches and the bosses. The bosses are shaped so as to "interlock" the terminal tabs so as to stabilize the terminal tabs under axial loading in both directions as in connecting with and disconnecting from the terminals 38 of the stator assembly.

A brush holder according to the invention is especially advantageous in the bifurcated form of the present embodiment which provides for two connections to one brush. As seen in FIG. 5, the substantially rectangular flat pattern 171 comprises two smaller component rectangular portions, sleeve portion 172 and terminal portion 174 connected by the support arm 114. As the flat pattern indicates the brush holder may be manufactured with very little material waste. Relatively low manufacturing cost makes it cost effective to use a brush holder (52) according to the invention in motor assemblies requiring only one connection to each brush, leaving one terminal tab inactive. Clearly, either terminal tab 134, 136 may be used in such an application and a requirement for manufacturing specific left-hand or right-hand parts may be avoided.

Although such an embodiment is not shown in the drawings it will be understood that the general form of brush holder and brush holder insulator or carrier combination according to the invention, may be embodied in a brush holder assembly with a single terminal tab. Other embodiments, falling within the scope of the invention and intended to be embraced by the claims which follow, will suggest themselves to those of ordinary skill in the art.

We claim:

1. A brush holder subassembly for an electric motor, the motor having an axis of rotation and including a motor housing and a plurality of motor elements including at least one field winding and a switch, comprising:

an insulator including a body having a through bore and a support element disposed externally of the body; and a brush holder of conductive material, including a sleeve portion for slidably receiving a brush, housed in fixed position in the bore of the insulator body, and an integral elongated terminal portion fixedly connected to the sleeve portion, disposed externally of the insulator body and extending perpendicular to the longitudinal axis of the insulator body bore and including a free connecting end for electrical connection to one of the motor elements, and an opposite support end for engaging the support element of the insulator so as to stabilize the disposition of the terminal portion relative to the sleeve portion.

2. The brush holder subassembly of claim 1 wherein the insulator includes a guide surface extending perpendicular to the longitudinal axis of the insulator bore for engaging the motor housing, so as, in assembly, to at least partially fix the position of the brush holder subassembly with respect to the motor housing.

3. The brush holder subassembly of claim 1 wherein, in assembly, the brush holder terminal portion extends parallel to the axis of rotation of the motor.

4. The brush holder subassembly of claim 3 wherein the insulator body includes a slot communicating with the bore and the brush holder includes an elongated support member extending through the slot and connecting the brush holder sleeve portion to the terminal portion.

5. The brush holder subassembly of claim 1 wherein the brush holder includes a second terminal portion spaced from and extending parallel to the first terminal portion to comprise a terminal pair.

6. The brush holder subassembly of claim 5 wherein the brush holder includes a terminal support arm which, in assembly, emerges from the insulator body and connects the brush holder sleeve portion to the terminal pair.

7. The holder holder subassembly of claim 5 wherein the insulator includes a second support element and the support elements are disposed so that each terminal portion is engaged and substantially independently stabilized by a support element.

8. The brush holder subassembly of claim 1 wherein the brush holder is formed from a single piece of sheet material.

9. The brush holder subassembly of claim 1 wherein the support element of the insulator is contoured in a plane perpendicular to the axis of the insulator body bore, and wherein the terminal portion support end includes a mating contour disposed so that insertion of the brush holder sleeve portion into the insulator bore brings the brush holder terminal portion into supportive engagement with the insulator support element.

10. The brush holder subassembly of claim 9 wherein the engagement of the terminal portion with the support element provides support for the terminal portion in mutually opposing directions in a plane perpendicular to the axis of the bore of the body.

11. The brush holder subassembly of claim 1 wherein in assembly a portion of the insulator body is interposed between the brush holder sleeve and terminal portions.

12. The brush holder subassembly of claim 1 wherein the insulator body bore abuts an end face of the body and the holder includes an arcuate tang extending from the sleeve portion to engage the end face.

13. A unitary brush holder for an electric motor comprising:
- an elongated sleeve for slidably receiving a brush, the sleeve having a plurality of side walls and a longitudinal axis;
- a first elongated terminal tab having a free connecting end and an opposite support end, spaced from the sleeve walls and offset with respect to the sleeve axis and extending in a plane perpendicular to the sleeve longitudinal axis; and
- a support arm for carrying the terminal tab, extending cantilever fashion from one of the sleeve walls to the support end of the terminal tab.

14. The brush holder of claim 13 and including a second elongated terminal tab extending parallel to and spaced from the first tab, and also carried by the support arm.

15. The brush holder of claim 14 wherein the support arm includes a transversely extending bridging strip having opposite ends and one each of the respective terminal tabs is carried by the bridging strip adajcent one of its ends.

16. The brush holder of claim 14 wherein the first and second terminal tabs are substantially coplanar.

17. The brush holder of claim 14 wherein the brush holder is formed from a single piece of sheet material having, in the flat, a substantially rectangular shape, and wherein substantially all of the material of the rectangular shape is used in the forming of the brush holder.

18. The brush holder of claim 17 wherein the rectangular shape of the piece of sheet material comprises two side-by-side portions, each of substantially rectangular shape, one for forming the sleeve portion and the other for forming the terminal portion.

19. The brush holder of claim 13 wherein the support arm extends from one of the walls of the sleeve and at an angle of less than 90 degrees to the axis of the sleeve.

20. A unitary brush holder for use with an electric motor, the motor having an armature with a commutator and a field substantially surrounding the armature, and a pair of brushes for maintaining electrical contact with the commutator and the motor having a wiring circuit schematic including two electrical connections to each brush, comprising:
- an elongated sleeve for slidably receiving a brush and having side walls;
- a pair of spaced apart elongated terminal tabs extending parallel to the axis of the armature and in a plane perpendicular to the axis of the sleeve, and spaced from the sleeve; and
- a support arm for carrying the terminal tabs, extending cantilever fashion from a wall of the sleeve.

21. The brush holder of claim 20 wherein the terminal tabs are connected by an elongated strip extending transversely of and rigidly connected to the support arm.

22. The brush holder of claim 20 wherein the brush holder is formed from a single piece of sheet material having, in the flat, a substantially rectangular shape and wherein in the forming of the brush holder substantially all of the material of the rectangular shape is used.

23. A small electric motor for use in portable tools and appliances, comprising:
- an armature having a commutator;
- a stator assembly substantially enclosing the armature and including a plurality of field windings and having opposite ends including a commutator end adjacent the commutator;
- at least one pair of spaced apart terminal elements carried by the stator commutator end, and facing axially outwards with respect to said end, and connected electrically to the field windings;
- a pair of diametrically opposed radially extending brushes for maintaining electrical contact with the commutator; and
- a first unitary brush holder having a sleeve for slidably supporting one of the brushes and including a pair of axially extending terminal tabs, spaced apart and integral with but remote from the sleeve, and registering with the terminal elements of the stator so as to directly electrically connect the brush holder with the field windings and complete electrical connection between the armature and the field windings.

24. The electric motor of claim 23 wherein the brush holder terminal tabs are coplanar in a plane perpendicular to the axis of the brush holder sleeve.

25. The electric motor of claim 23, and including a second pair of terminal elements at the commutator end of the stator and a second unitary brush holder having a pair of terminal tabs engaging said second pair of terminal elements for completing electrical contact between the armature and field windings, and wherein the field windings are electrically split into at least two field winding portions and the armature is connected electrically in series with the field portions and between at least one pair of field portions, said connection being maintained by the brush holders and brushes in combination.

26. The electric motor of claim 25 wherein the field windings include run winding and brake winding portions for running and dynamically braking the motor respectively, and wherein both the run and brake windings are electrically split with respect to the armature.

* * * * *

UNITED STATES PATENT AND TRADEMARK OFFICE
CERTIFICATE OF CORRECTION

PATENT NO.   : 4,963,779

DATED        : October 16, 1990

INVENTOR(S)  : Lynn E. Lentino et al

It is certified that error appears in the above-identified patent and that said Letters Patent is hereby corrected as shown below:

At column 1, line 13, change "patentially" to --potentially--.

At column 1, line 17, after "Harris" insert: --et al--.

At column 1, line 40, after "in" insert a comma.

At column 2, line 1, change "portions" to --portion--.

At column 3, line 4, after "brush" insert: --holder--;

line 5, delete "holder".

At column 3, line 36, at the beginning of the line change "end" to --and--.

Column 4, line 44, after the number "90" insert: --degrees--.

At column 4, line 47, change "coventional" to --conventional--.

At column 6, line 50 in claim 1, after "portion" insert: --carried in a cantilever fashion and--.

At column 7, line 1, in claim 4, change the numeral "3" to --1--.

At column 7, line 7, in claim 5, change the numeral "1" to --3--.

UNITED STATES PATENT AND TRADEMARK OFFICE
CERTIFICATE OF CORRECTION

PATENT NO. : 4,963,779

DATED : October 16, 1990

INVENTOR(S) : Lynn E. Lentino et al

It is certified that error appears in the above-identified patent and that said Letters Patent is hereby corrected as shown below:

At column 8, in claim 23, at line 46, delete "the stator" and insert: --said--;

same line, after "end" insert: --of the stator assembly--;

line 55, delete "integral with but" and insert: --supported in a cantilever fashion--;

at line 56, after "stator" insert: --assembly--.

At column 8, line 63, in claim 24, change "the" first occurrence to --an--.

At column 8, in claim 25, at line 66, after "stator" insert: --assembly--

At column 9, in claim 25, at the fourth and fifth lines from the top of the column, after "field" insert: --winding--; Also in the fifth line from the top of the column, delete "said".

Signed and Sealed this

Ninth Day of June, 1992

Attest:

DOUGLAS B. COMER

*Attesting Officer*　　*Acting Commissioner of Patents and Trademarks*